(12) United States Patent
Bali et al.

(10) Patent No.: US 9,154,992 B1
(45) Date of Patent: *Oct. 6, 2015

(54) WIRELESS SCHEDULER BANDWIDTH ESTIMATION FOR QUICK START

(71) Applicant: SPRINT COMMUNICATIONS COMPANY L.P., Overland Park, KS (US)

(72) Inventors: Soshant Bali, Danville, CA (US); Jing Yea, Hillsborough, CA (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 14/280,147

(22) Filed: May 16, 2014

Related U.S. Application Data

(63) Continuation of application No. 13/645,827, filed on Oct. 5, 2012, now Pat. No. 8,767,746, which is a continuation of application No. 12/262,226, filed on Oct. 31, 2008, now Pat. No. 8,320,385.

(51) Int. Cl.
*H04W 28/02* (2009.01)
(52) U.S. Cl.
CPC ............................ *H04W 28/0289* (2013.01)

(58) Field of Classification Search
CPC ............... A61K 2300/00; A61M 2005/14268; A61M 2205/0266; H04L 47/32
See application file for complete search history.

(56) References Cited

U.S. PATENT DOCUMENTS

| | | | | |
|---|---|---|---|---|
| 5,345,513 | A * | 9/1994 | Takeda et al. | 382/132 |
| 5,521,925 | A * | 5/1996 | Merakos et al. | 370/337 |
| 8,767,746 | B1 * | 7/2014 | Bali et al. | 370/395.41 |
| 2003/0193906 | A1 * | 10/2003 | Andrews et al. | 370/329 |
| 2009/0285196 | A1 * | 11/2009 | Lee et al. | 370/345 |

* cited by examiner

*Primary Examiner* — Yong Zhou

(57) ABSTRACT

A method, wireless system, and medium are provided for estimating capacity for a new communication session initiated by a wireless device. The wireless system includes a base station and wireless devices that wirelessly connect to the base station. The base station executes a wireless scheduler that coordinates wireless transmission over wireless networks. The base station also executes a bandwidth estimation component to estimate available bandwidth for a new communication session. The estimated available bandwidth is used in a quick configuration message communicated from the base station to a wireless device to notify the wireless device of the capacity available at the base station and of a transmission rate for the wireless device.

6 Claims, 5 Drawing Sheets

WIRELESS SCHEDULER BANDWIDTH ESTIMATION FOR QUICK START

RELATED APPLICATIONS

This application is a continuation of U.S. application Ser. No. 13/645,827, filed on Oct. 5, 2012, which is a continuation of U.S. application Ser. No. 12/262,226, and filed on Oct. 31, 2008, now U.S. Pat. No. 8,320,385, which are incorporated herein by reference in the entirety.

INTRODUCTION

Currently, conventional wireless devices may connect to wireless data networks to complete data transfers between the conventional wireless devices and servers on the Internet. During the data transfer, a bottleneck in an end-to-end path between the servers and the conventional wireless devices may be found at the base station-to-conventional wireless device segment of the end-to-end path because base station-to-conventional wireless device segment may be the minimum bandwidth capacity segment in the end-to-end path.

Initially, the server is not able to fully utilize the entire bandwidth available in the bottleneck link because the server must slowly increase a window size for the data transfer until the conventional wireless device is fully utilizing the available bandwidth on the base station-to-conventional wireless device segment of the end-to-end path. After each increase in window size, the server waits for an acknowledgement from the wireless device before utilizing additional available bandwidth on the base station-to-conventional wireless device segment of the end-to-end path. Waiting for the acknowledgement from the wireless device causes delays in completion of the data transfer from the server to the conventional wireless device. The delay may be measured by round trip times, which may include the time period that elapses when sending a packet from the server to the wireless device and when receiving a response at the server acknowledging receipt of the packet at the wireless device.

Additional delays may occur at the base station because the base station services multiple conventional wireless devices. Each of the conventional wireless devices has a separate data transfer queue that is serviced by a proportional fair scheduler executing on the base station. The proportional fair scheduler is channel-aware and increases the throughput at the base satiation by scheduling transmission of data in the data transfer queue of a conventional wireless device when the conventional wireless device is experiencing good channel conditions.

SUMMARY

Embodiments of the invention are defined by the claims below. Embodiments of the invention provide wireless systems and methods for, among other things, estimating capacity available for a wireless device. The wireless systems and methods have several practical applications in the technical arts including reducing connection initiation times for new communication sessions with a wireless device, improving resource utilization at the base station; preventing congestion at a server by reducing download times, and matching the server transmission rate to the estimated capacity at a base station wirelessly connected to the wireless device.

In a first embodiment, a wireless system having a base station and wireless devices is provided. The base station includes a wireless scheduler configured to coordinate wireless transmission over wireless networks and a bandwidth estimation component to estimate available bandwidth for a communication session. The base station classifies the communication sessions as elastic or inelastic to determine unused capacity that the base station analyzes to estimate available bandwidth for a new communications session initiated by a wireless device.

In a second embodiment, a wireless scheduler executing on a base station to allocate bandwidth to a communication session is provided. The wireless scheduler is configured to perform a method to estimate capacity for a new session initiated by a wireless device wirelessly connected to the base station. The method includes identifying a number of wireless devices having data in a queue maintained by the base station and classifying communication sessions corresponding with each of the wireless devices communicating with the base station. In turn, the base station determines a number of unused time slots during communication sessions corresponding with a subset of wireless devices and estimates a capacity for a new session initiated by the wireless device based on the number of unused time slots available for elastic communication sessions.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Figure 1:
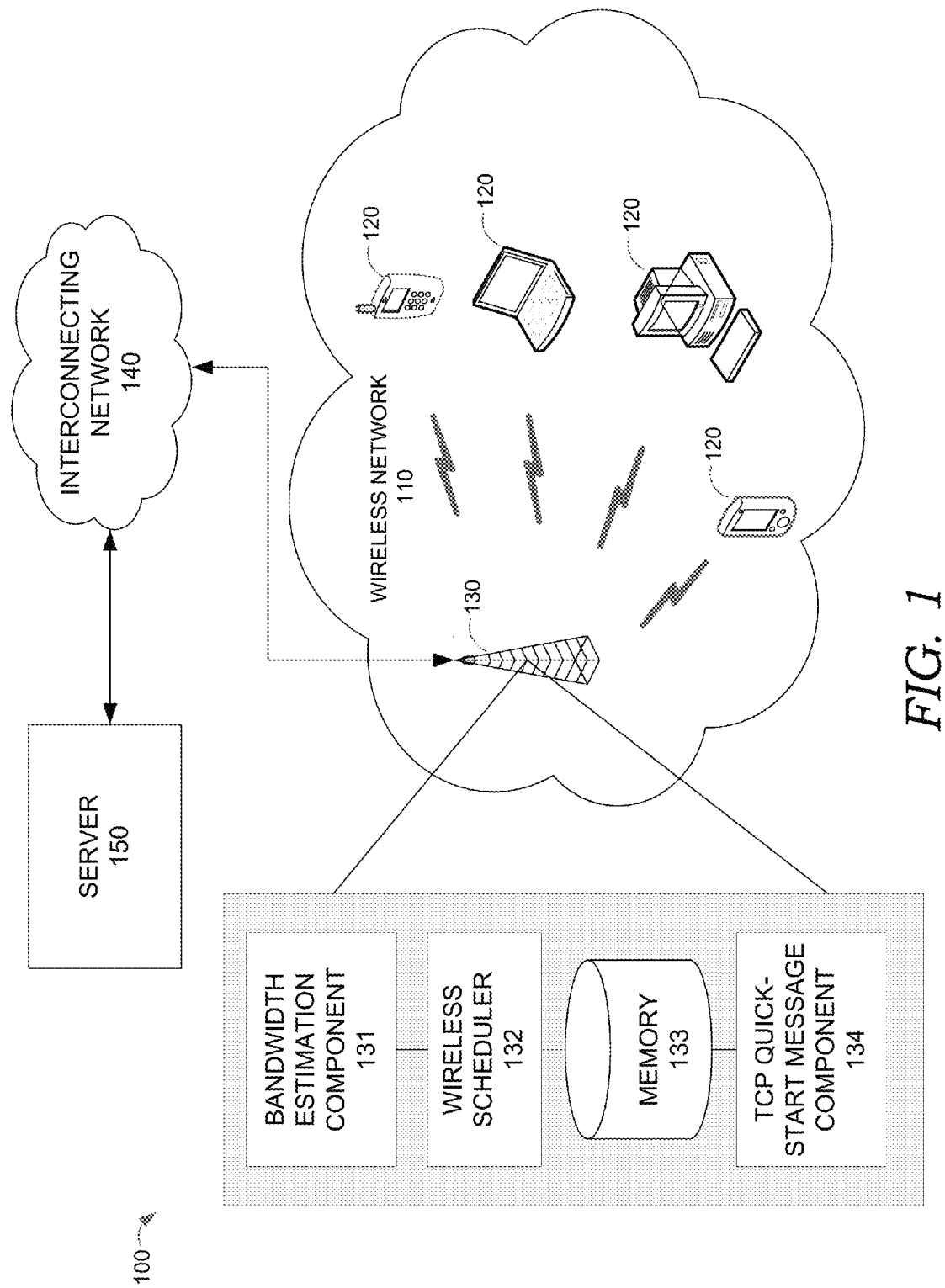
FIG. 1 is an exemplary network diagram that illustrates a wireless system, in accordance with embodiments of the invention.

Embodiments of the present invention provide wireless systems and methods for estimating capacity at a base station for a new transmission control protocol (TCP) communication session initiated by a wireless device. The estimated capacity may be used in a quick start message that is transmitted over the wireless network from the base station to the wireless device when initiating a new TCP communication session. The base station is configured with a bandwidth estimation component that executes an algorithm for quickly evaluating capacity at the base station. The bandwidth estimation component allows the base station to efficiently utilize the bandwidth without increasing congestion on the wireless network. The bandwidth estimation component reduces the number of overhead messages that traverse the wireless network and enables the base station to transmit more data messages and fewer control messages during wireless communication. The estimated capacity is used by the TCP Quick-start message component to communicate the estimated available capacity to the wireless device or the server.

As one skilled in the art will appreciate, embodiments of the invention include, among other things: a method, wireless system, and computer-program product. Accordingly, the embodiments may take the form of a hardware embodiment, a software embodiment, or an embodiment combining software and hardware. In one embodiment, the invention takes the form of a computer-program product that includes computer-useable instructions embodied on one or more computer-readable media.

As used herein, the term "component" refers to any combination of hardware, software, and firmware. As used herein, the term "unused time slot" refers to any time slot that is assigned to a wireless device, where the bandwidth associated with the time slot is partially used by the wireless device or is not used at all by the wireless device.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to Random Access Memory (RAM), Read Only Memory (ROM), Electrically Erasable Programmable Read Only Memory (EEPROM), flash memory or other memory technology, Compact Disc Read Only Memory (CD-ROM), digital versatile discs (DVD), holographic media or other optical disc storage, magnetic cassettes, magnetic tape, magnetic disk storage, and other magnetic storage devices. These computer-storage media can store data momentarily, temporarily, or permanently.

A wireless system includes base stations, wireless devices, and a wireless network that connects the base stations and wireless devices. In the wireless system, the base stations are configured with wireless schedulers that select time slots to assign to the wireless devices. The wireless schedulers may include channel-aware schedulers that select wireless devices based on, among other things, channel conditions observed by the wireless devices. The base stations may also include bandwidth estimation components that estimate available capacity for a new communication session initiated by the wireless device.

In some embodiments, a new communication session is established when a Transmission Control Protocol (TCP) Synchronize sequence number (SYN) packet is received by the base station and the base station employs a bandwidth estimation component to calculate an estimated capacity for the new communication session. In turn, a TCP Quick-start message component inserts a bandwidth estimate in a quick start message to inform a wireless device of the estimated capacity.

In some embodiments, a new communication session is established when a Transmission Control Protocol (TCP) Synchronize sequence number acknowledgement (SYN-ACK) packet is received by the base station and the base station employs a bandwidth estimation component to calculate an estimated capacity for the new communication session. In turn, a TCP Quick-start message component inserts a bandwidth estimate in a quick start message to inform a wireless device of the estimated capacity.

FIG. 1 is an exemplary network diagram that illustrates a wireless system 100, in accordance with embodiments of the invention. The wireless system 100 includes a wireless network 110, wireless devices 120, base stations 130, interconnecting network 140, and server 150.

The wireless network 110 may include an Evolution Data Optimized (EVDO) wireless network. In some embodiments, the wireless network may include a local area network, a wide area network, a virtual private network, or the Internet. The wireless network 110 connects wireless devices 120 to the base station 130 to complete wireless communications. The wireless network 110 may use time slots to transmit wireless communications between the wireless devices 120.

The wireless devices 120 are devices that generate or receive communication packets having voice, video, or data. The wireless devices 120 include, but are not limited to, laptops, personal computers, mobile phones, personal digital assistants, smart phones, and other computing devices. The wireless devices 120 may initiate a new communication session by transmitting a SYN packet to the base station 130. In certain embodiments, the wireless devices 120 monitor channel conditions on the wireless network 110 and transmit the channel conditions to the base stations 130. The wireless devices 120 also receive a recommended communication rate, in the TCP quick-start message, from the base station 130 based on the observed channel conditions and an estimated available capacity at the base station 130. The wireless devices 120 may receive recommended communication rates based on the current channel conditions to the base stations 130.

The base stations 130 receive communication requests and current channel conditions from the wireless devices 120. The base stations 130 are configured with bandwidth estimation components 131, wireless schedulers 132, memory 133, and TCP quick start message component 134. The base stations 130 enable wireless communication among the wireless devices 120.

The bandwidth estimation components 131 estimate the capacity available at the base station for a new communication session. A bandwidth estimation component 131 determines a number (N) of wireless devices 120 actively communicating via the base station 130. In some embodiments, the base station 130 may store in memory 133 the exponentially averaged communication rate reported, during each time slot (t), by each wireless device 120. In an embodiment, the time slot t is 1.67 milliseconds. $R_i(t)$ is the current communication rate of ith wireless device 120 during time slot t. The bandwidth estimation component 131 calculates an exponentially averaged communication rate ($\overline{R_i(t)}$) for each wireless device 120 using the reported communication rates $R_i(t)$. The bandwidth estimation component 131 evaluates $\overline{R_i(t)} = \beta R_i(t) + (1-\beta)\overline{R_i(t-1)}$ to determine the exponentially averaged communication rate for a wireless device 120. The beta value ($\beta$) is a configurable constant value such as, but not limited to, $1/10000$. The exponentially averaged communication rate $\overline{R_i(t)}$ for time slot t is based on a communication rate $R_i(t)$ at time slot t and an exponentially averaged communication rate $\overline{R_i(t-1)}$ at time t−1.

Additionally, the bandwidth estimation component 131 classifies communication sessions associated with the wireless devices 120 as elastic or inelastic. A communication session is elastic when the rate of transmission grows during the communication session to exhaust the allocated bandwidth. In other words, elastic communication sessions adapt the transmission rate to use up the available bandwidth at the base station, e.g., long file transfer using File Transfer Protocol (FTP). A communication session is inelastic when the rate of transmission fails to grow during the communication session to exhaust the allocated bandwidth. In other words, inelastic communication sessions use up only a fraction of the available bandwidth at the base station, e.g., Voice Over Internet Protocol (VoIP) communications. The bandwidth estimation component 131 monitors packets transmitted to each wireless device to determine that the communication session is elastic or inelastic based on an exponentially averaged rho value ($\bar{\rho}$). The bandwidth estimation component 131 evaluates $\rho_i(t)=1$ if one or more packets for the ith wireless device 120 are received at the base station 130. The bandwidth estimation component 131 evaluates $\rho_i(t)=0$ if no packets for the ith wireless device 120 are received at the base station. The bandwidth estimation component 131 may store rho values for each wireless device 120 in memory 133. The bandwidth estimation component 131 calculates $\overline{\rho_i(t)}=\beta\rho_i(t)+(1-\beta)\overline{\rho_i(t-1)}$. In an embodiment, the bandwidth estimation component 131 establishes a constant epsilon ($\epsilon$) such as, but not limited to, 5/100. If $\overline{\rho_i(t)} \rangle 1-\epsilon$, the communication session for the ith wireless device 120 is classified as elastic by the bandwidth estimation component 131. Otherwise, the communication session is classified as inelastic. The bandwidth estimation component 131 generates a set (E) for wireless devices 120 having elastic communication sessions and counts a number ($N_E$) of wireless devices 120 wirelessly communicating with the base station 130 via the elastic communication sessions. The bandwidth estimation component 131 generates a set (I) for wireless devices 120 having inelastic communication sessions and counts a number ($N_I$) of inelastic wireless devices 120 wirelessly communicating with the base station 130 via the inelastic communication sessions.

Moreover, the bandwidth estimation component 131 estimates the arrival rate for packets destined for the wireless devices. The estimated arrival rates ($\lambda_i(t)$) may be measured in bits per second. The bandwidth estimation component 131 stores the estimated arrival rates $\lambda_i(t)$ for each wireless device 120 in memory 133. In some embodiments, memory 133 includes a database. The bandwidth estimation component 131 calculates an eta value ($\eta$) as an average ratio of the estimated arrival rate $\lambda_i(t)$ for the ith wireless device 120 and the exponential average communication rate $\overline{R_i(t)}$ for the ith wireless device 120 at time slot t. The bandwidth estimation component 131 evaluates $$\eta_i(t) = \frac{\lambda_i(t)}{\frac{\overline{R_i(t)}}{N}}$$

for each wireless device 120 to determine available bandwidth based on a total inelastic leftover (L) for the base station 130.

The bandwidth estimation component 131 calculates a total inelastic leftover (L) for the base station 130. The bandwidth estimation component 131 evaluates $$L = \frac{N_I - \sum_{i \in I} \overline{\eta_i(t_a)}}{N}.$$

At time $t_a$ when a new wireless device 120 (j) attempts to connect to the base station 130 or a new communication session is initiated, the bandwidth estimation component 131 calculates the total inelastic leftover (L) to determine the leftover capacity by monitoring a difference between a fair share of capacity allocated to all inelastic wireless devices 120 and capacity actually used by the inelastic wireless devices 120.

In turn, the bandwidth estimation component 131 generates the available estimated capacity ($B_j(t_a)$) for the jth wireless device 120 or a new communication session. The bandwidth estimation component 131 evaluates $$B_j(t_a) = \overline{R_j(t_a)}\left(\frac{1}{N} + \frac{L}{N_E}\right).$$

In some embodiments, the new communication session from the jth wireless device 120 is classified as elastic and the jth wireless device 120 is included in the set E of elastic wireless devices if not already included in the set. Also, the bandwidth estimation component 131 may generate a recommended transmission rate for the jth wireless device 120 based on the available estimated capacity $B_j(t_a)$.

The wireless schedulers 132 select wireless devices 120 to communicate in a time slot based on, among other things, the current channel conditions and weighted average functions of the communication rate associated with each wireless device 120. The base stations 130 schedule and select the wireless devices 120 to communicate in a time slot when a specified function of the channel conditions and the weighted average functions are good in comparison with other wireless devices 120. For example, in certain wireless schedulers 132: $R_i[t]$ is the current rate of ith wireless device 120 during time slot t; $A_i[t]=(1-\alpha)A_i[t-1]$ may be the weighted average function of the communication rate used for the ith wireless device 120 when the ith wireless device 120 is not scheduled in slot t; and $A_i[t]=(1-\alpha)A_i[t-1]+\alpha R_i[t]$ may be the weighted average function of the communication rate for the ith wireless device 120 when the ith wireless device 120 is scheduled in slot t. The alpha value ($\alpha$) is a configurable constant value such as, but not limited to, 1/10000. In such cases, the wireless scheduler 132 may calculate the ratio ($R_i[t]/A_i[t]$) for each wireless device 120 to select the wireless device 120 with the largest ratio. These wireless schedulers 132 calculate the weighted average functions of the communication rate ($A_i[t]$) for each wireless device 120 having data in a memory 133, i.e., a data queue, at the base station 130 to prevent starvation of other wireless devices 120 that are not assigned to the time slot.

The TCP quick start message component 134 receives an estimated capacity $B_j(t_a)$ or a recommended transmission rate from the bandwidth estimation component 134 and modifies quick start messages, i.e, SYN packets or SYN-ACK packets, received at the base station 130 to include an estimated capacity $B_j(t_a)$ or a recommended transmission rate. In an embodiment, the wireless device 120 requests a data transmission, i.e., a user clicks on links provided by a webpage rendered on the wireless device 120, from the server 150 by wirelessly transmitting a SYN packet to the base station 130. The base station 130 receives the SYN packet and routes the SYN packet over the interconnecting network 140 to the server 150. The server 150 receives the SYN packet and generates a SYN-ACK packet to acknowledge the receipt of the request. The server 150 transmits the SYN-ACK packet over the interconnecting network 140 to the base station 130. The base station 130 executes the TCP quick start message component 134 to modify the SYN-ACK-packet to include the estimated capacity $B_j(t_a)$ or the recommended transmission rate. The base station 130 transmits the modified SYN-ACK packet to the wireless device 120. The wireless device 120 acknowledges the estimated capacity $B_j(t_a)$ or the recommended transmission rate included in the SYN-ACK packet. The wireless device also transmits a modified ACK packet to the base station 130. The base station 130 routes the acknowledged and modified ACK packet over the interconnecting network 140 to the server 150. The server 150 receives the acknowledged and modified ACK packet, parses the ACK packet, and transmits the requested data to the wireless device 120 to exhaust the estimated capacity $B_j(t_a)$. Alternatively, the server 150 transmits the requested data to the wireless device 120 at the recommended transmission rate. In another embodiment, the server 150 initiates a data transmission, i.e., pushes data, such as, but not limited to, email, to the wireless device 120, from the server 150 by transmitting a SYN packet over the interconnecting networking 140 to the base station 130. The base station 130 receives the SYN packet and routes the SYN packet. The base station 130 executes the TCP quick start message component 134 to modify the SYN packet to include the estimated capacity $B_j(t_a)$ or the recommended transmission rate. The base station 130 transmits the modified SYN packet to the wireless device 120. The wireless device 120 acknowledges the estimated capacity $B_j(t_a)$ or the recommended transmission rate included in the SYN packet. The wireless device also transmits a modified SYN-ACK packet to the base station 130. The base station 130 routes the acknowledged and modified SYN-ACK packet over the interconnecting network 140 to the server 150. The server 150 receives the acknowledged and modified SYN-ACK packet, parses the SYN-ACK packet, and transmits the pushed data to the wireless device 120 to exhaust the estimated capacity $B_j(t_a)$. Alternatively, the server 150 transmits the pushed data to the wireless device 120 at the recommended transmission rate.

The interconnecting network 140 connects servers 150 to the base stations 130. The interconnecting network 140 may include a local area network, a wide area network, a virtual private network, or the Internet. The interconnecting network 140 allows the servers 150 to communicate with wireless devices 120 via the base stations 130 that connect to the interconnecting network 140. The interconnecting network 140 may transmit and receive quick start messages, including SYN-ACK packets or SYN packets.

The servers 150 may push data to the wireless devices or respond to requests for data received from the wireless devices 120. The servers 150 are connected to the interconnecting network 140 and communicate with wireless devices 120 via the base stations 130. The servers 150 may include content servers, multimedia servers, email servers, web servers, or storage servers.

In some embodiments, the wireless device 120 may communicate with a content server device on the Internet, and the base station may operate as a broker between the wireless devices and the content server device. The base station may communicate the estimated capacity and recommended transmission rates to the content server device to setup a communication session between the wireless device 120 and the content server device.

One of ordinary skill in the art appreciates and understands that alternate arrangements are within the scope and spirit of this description. Also, one of ordinary skill in the art appreciates and understands that the wireless system 100 has been simplified to facilitate a clear description of embodiments of the invention.

To prevent and minimize starvation of wireless devices, the wireless schedulers utilized by the base stations are configured to be channel-aware and to estimate bandwidth available to a new communication session. Moreover, the base station generates a quick configuration message to provide the wireless device that initiated the communication with a recommended rate. In an alternate embodiment, the base station generates a quick configuration message to provide the wireless device that initiated the communication session with the recommended rate. The base station may be configured to execute a method for estimating the bandwidth based the classification of the communications session and wireless devices connected to the base station.

Figure 2:
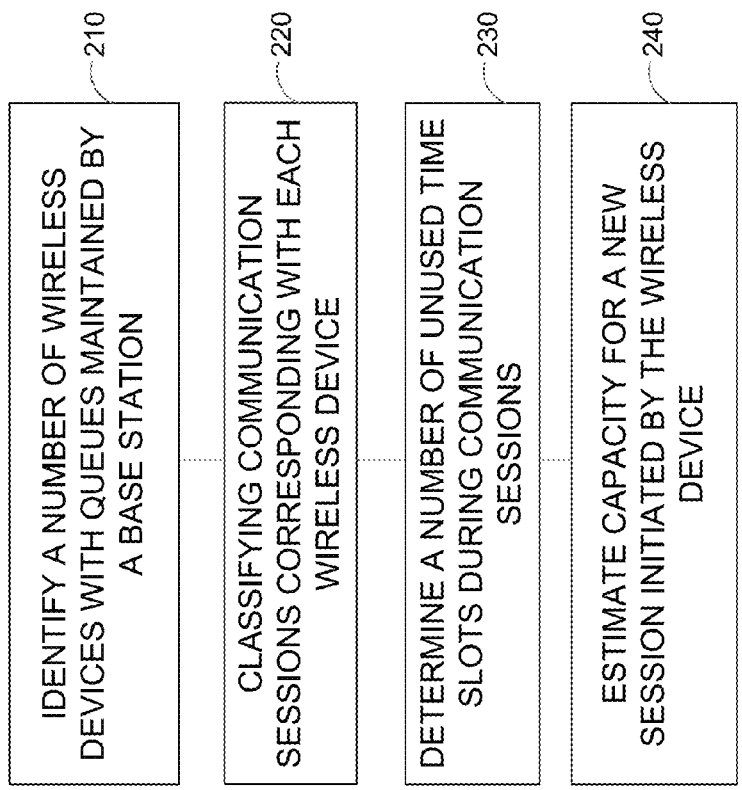
FIG. 2 is an exemplary logic diagram that illustrates a method for estimating capacity for a new communication session initiated by a wireless device, in accordance with embodiments of the invention.

FIG. 2 is an exemplary logic diagram that illustrates a method for estimating capacity for a new communication session initiated by a wireless device, in accordance with embodiments of the invention. In step 210, a number of wireless devices having data in a queue maintained by a base station are identified by the base station.

In step 220, communication sessions corresponding with each of the wireless devices communicating with the base station are classified by the base station. In an embodiment, a communication session is classified as elastic when a wireless device corresponding to the communication session receives packets at an adaptive rate. The packets associated with the communication session are received at an adaptive rate when the wireless device varies packet transmission to exhaust bandwidth available at the base station. In certain embodiments, a communication session is classified as inelastic when a wireless device corresponding to the communication session receives packets at an unadaptive rate. The packets associated with the communication session are received at an unadaptive rate when the wireless device fails to vary the packet transmission rate to exhaust the bandwidth available from the base station.

In turn, a number of unused time slots during communication sessions corresponding with a subset of wireless devices are determined by the base station in step 230. In step 240, the base station estimates a capacity for a new session initiated by the wireless device based on the number of unused time slots. Additionally, the base station transmits a quick start message to the wireless device with the estimated capacity. The base station may transmit the quick start message that includes the estimated capacity for a new communication session to the new wireless device. In some embodiments, the wireless device is a new wireless device that connects to the base station.

Accordingly, a base station executing a proportional fair scheduler and a bandwidth estimate component will observe that the inelastic wireless devices use a fraction of the bandwidth that is available to them. The base station determines a remainder of the bandwidth that is left unused by the inelastic wireless devices and reassigns the remainder to elastic wireless devices.

The base stations, wireless devices, and communications over the wireless network are simulated to determine the effectiveness of the bandwidth estimation component. The bandwidth allocated to a new wireless device is measured by a base station without a bandwidth estimation component is compared to bandwidth estimated for the new wireless device, where the estimated bandwidth is generated by a base station configured with a bandwidth estimation component. The results show that the bandwidth estimation component executed by the base station do not over-estimate the available bandwidth for the new wireless device allocated by a base station without the bandwidth estimation component.

Figure 3:
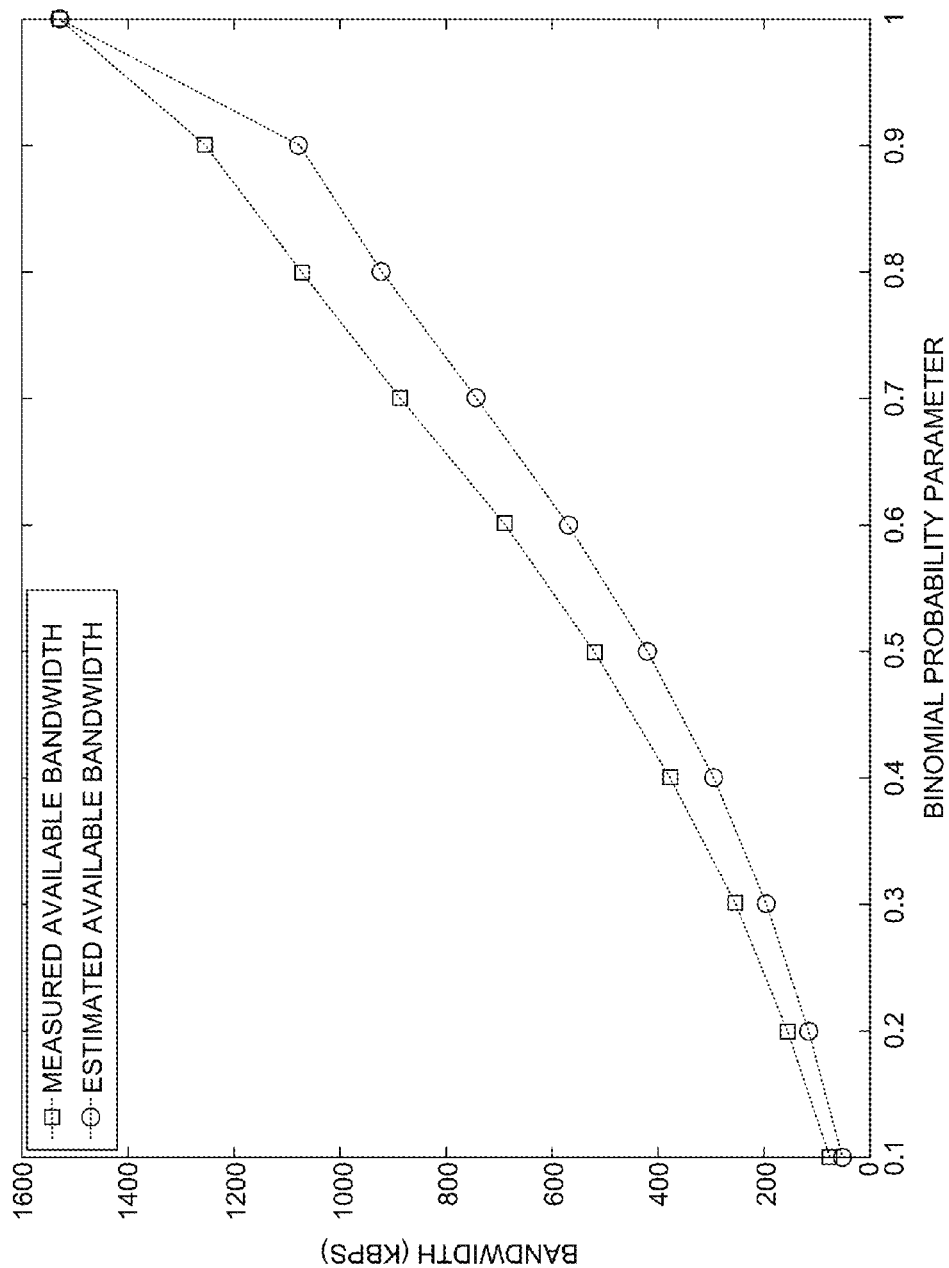
FIG. 3 is an exemplary graph that illustrates estimated bandwidth and actual measured bandwidth at the base stations as the achievable rate for the wireless devices change, in accordance with an embodiment of the invention.

FIG. 3 is an exemplary graph that illustrates estimated bandwidth and actual measured bandwidth at the base stations as the achievable rate for the wireless devices change, in accordance with an embodiment of the invention.

The binomial probability parameter allows the simulation to randomly select the communication rates for the wireless devices connected to the base stations during a period of 50,000 time slots. During the simulation, a new wireless device connects to the base station at time slot 15,000. At time slot 15,000 two wireless devices are connected to the base stations. One of the two wireless devices is an elastic wireless device and the other is an inelastic wireless device. The inelastic wireless device receives packets at 10 kbps. During time slots 20,000 to 50,000, the measured bandwidth allocated by a base station without the bandwidth estimation component is compared to the estimated bandwidth of the base station executing the bandwidth estimation component. The results in FIG. 3 show that the estimated bandwidth generated by the base station executing the bandwidth estimation component does not over-estimate the measured bandwidth allocated by the base station without the bandwidth estimation component. This suggests that the bandwidth estimation component executing on the base station effectively generates a valid estimate for bandwidth available to a new wireless device that attempts to connect to the base station.

Additional simulations are used to show that error difference between the estimated available bandwidth generated by the bandwidth estimation component and the actual available bandwidth allocated by a base station decreases based on changes in the transmission rate of the inelastic wireless devices. The simulation results confirm that over-estimation of the available bandwidth of a wireless device or server device is avoided by the base station configured with the bandwidth estimation component.

Figure 4:
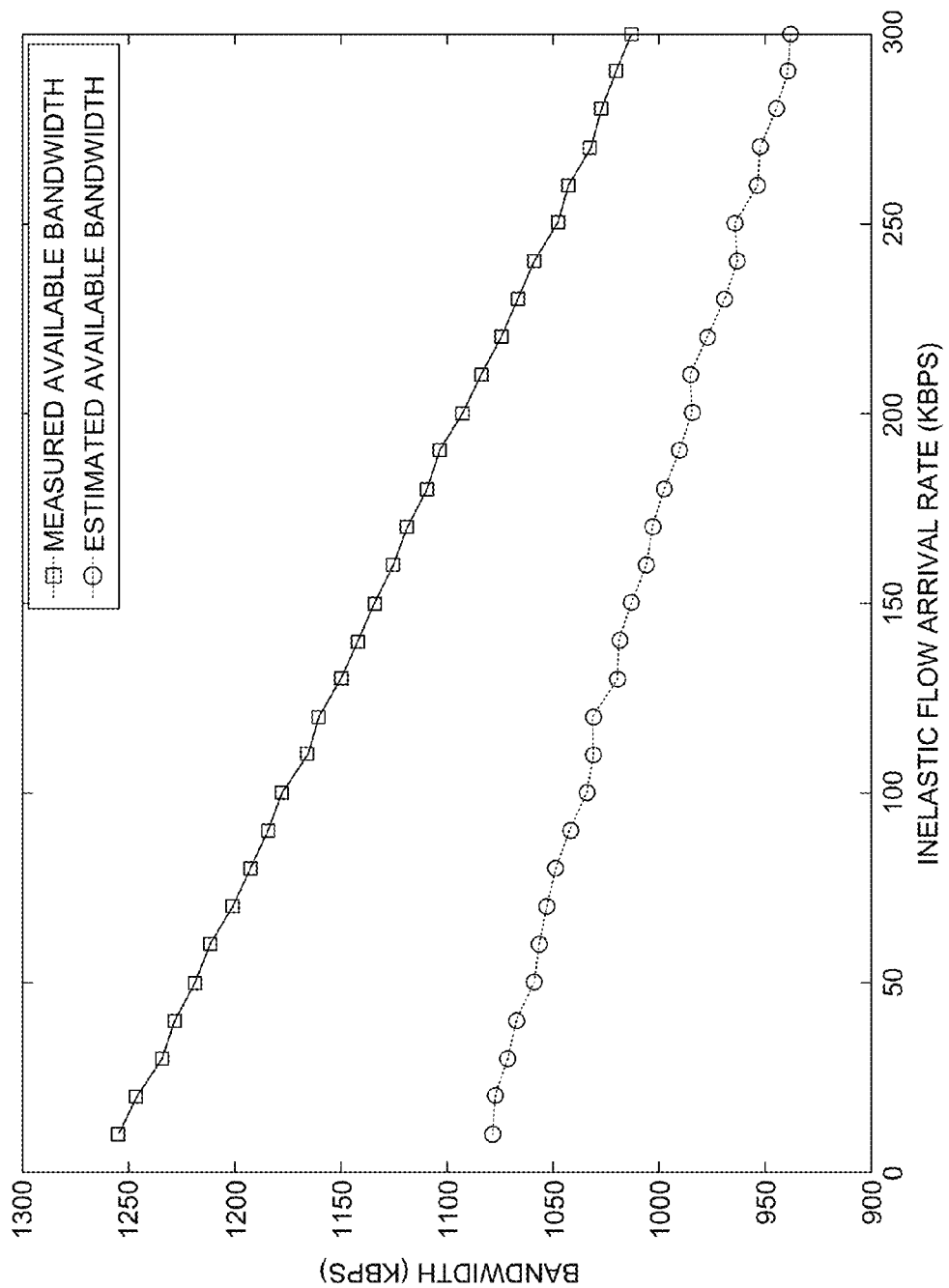
FIG. 4 is an exemplary graph that illustrates estimated bandwidth and actual measured bandwidth at the base stations as the transmission rate for the single inelastic wireless device changes, in accordance with an embodiment of the invention.

FIG. 4 is an exemplary graph that illustrates estimated bandwidth and actual measured bandwidth at the base stations as the transmission rate for the single inelastic wireless device changes, in accordance with an embodiment of the invention.

At time slot 15,000, two wireless devices are connected to the base stations. One of the two wireless devices is an elastic wireless device and the other is an inelastic wireless device. The inelastic wireless device receives packets at a rate that is varied between 10 kbps and 100 kbps in increment of 10 kbps. During the simulation, a new wireless device connects to the base station at time slot 15,000. From time slots 20,000 to 50,000, the measured bandwidth allocated by a base station without the bandwidth estimation component is compared to the estimated bandwidth of the base station executing the bandwidth estimation component. The results in FIG. 4 show that the estimated bandwidth generated by the base station executing the bandwidth estimation component does not over-estimate the measured bandwidth allocated by the base station without the bandwidth estimation component. The results also show that difference error between the measured bandwidth and the estimated available bandwidth reduces as transmission at the inelastic wireless device increases. Accordingly, the results suggest that the bandwidth estimation component executing on the base station effectively generates a valid estimate for bandwidth available to a new wireless device that attempts to connect to the base station at varying transmission rates for an inelastic wireless device.

Additional simulations results show that the estimated available bandwidth generated by the bandwidth estimation component is lower (0-15%) than the actual available bandwidth allocated by a base station without the bandwidth estimation component during changes in the configuration of the elastic wireless devices. Over-estimation of the available bandwidth may cause a wireless device or server device to transmit packets at a rate higher than a rate that is available at the base station resulting in congestion at the base station.

Figure 5:
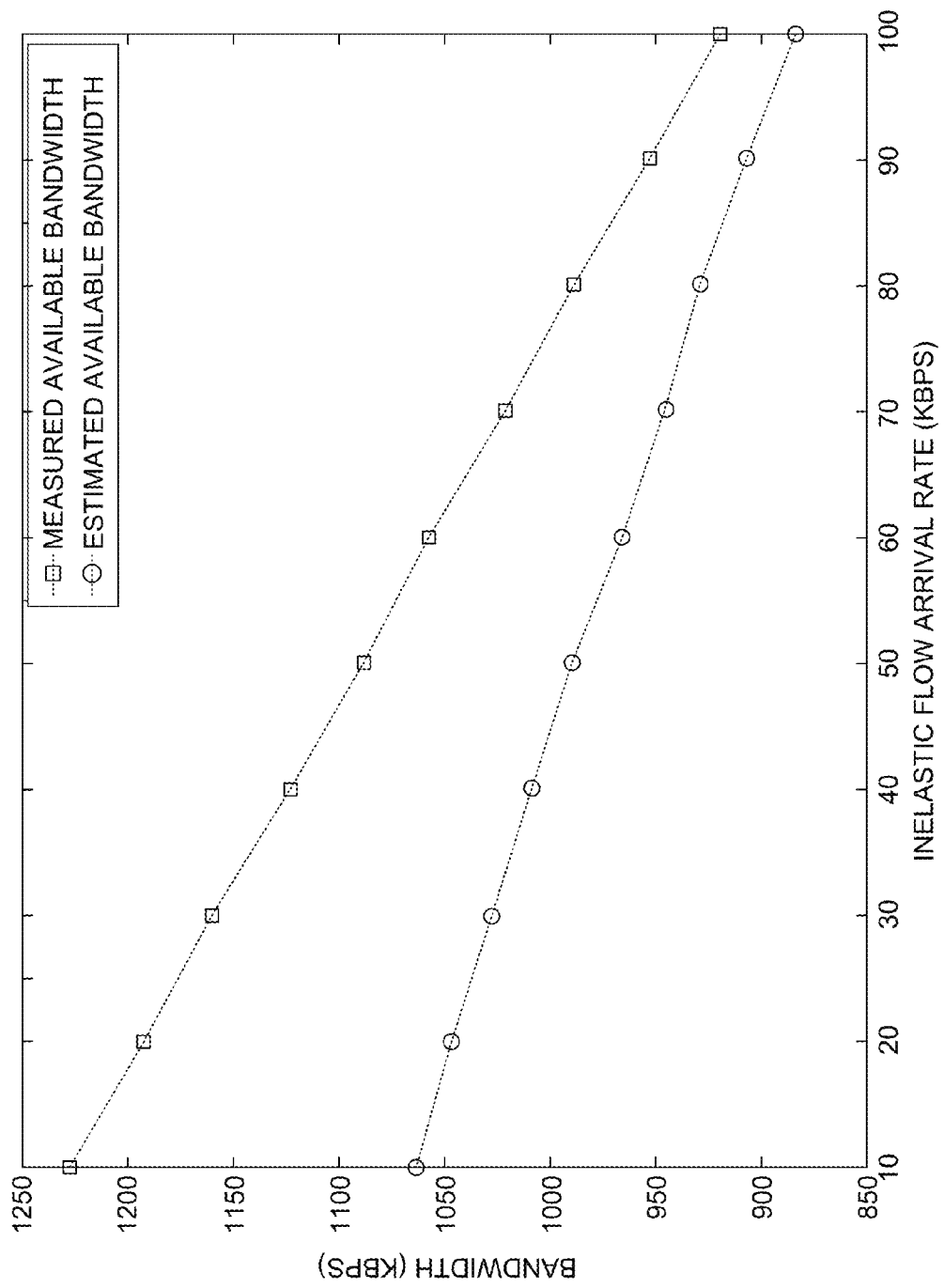
FIG. 5 is an exemplary graph that illustrates estimated bandwidth and actual measured bandwidth at the base stations as the transmission rate for one of four inelastic wireless devices changes, in accordance with an embodiment of the invention.

FIG. 5 is an exemplary graph that illustrates estimated bandwidth and actual measured bandwidth at the base stations as the transmission rate for one of three inelastic wireless devices changes, in accordance with an embodiment of the invention.

At time slot 15,000, four wireless devices are connected to the base stations. Three of the four wireless devices are inelastic wireless devices and the fourth wireless device is an elastic wireless device. The inelastic wireless devices receive packets at the same rate, approximately 10 kbps. During the simulation, a new wireless device connects to the base station at time slot 15,000. From time slots 20,000 to 50,000, the measured bandwidth allocated by a base station without the bandwidth estimation component is compared to the estimated bandwidth of the base station executing the bandwidth estimation component. The results in FIG. 5 show that the estimated bandwidth generated by the base station executing the bandwidth estimation component does not over-estimate the measured bandwidth allocated by the base station without the bandwidth estimation component. The results also show that difference error between the measured bandwidth and the estimated available bandwidth reduces as transmission at the inelastic wireless devices increases. Accordingly, the results suggest that the bandwidth estimation component executing on the base station effectively generates a valid estimate for bandwidth available to a new wireless device that attempts to connect to the base station as transmission rates increases for each inelastic wireless device.

Additional arrangements of the various components depicted, as well as components not shown, are possible without departing from the spirit and scope of the present invention. Embodiments of the invention are described with the intent to be illustrative rather than restrictive. Alternate embodiments will become apparent to those skilled in the art. A skilled artisan may develop alternate means of implementing the aforementioned improvements without departing from the scope of the invention. It is understood that certain features and subcombinations are of utility and may be employed without reference to other features and subcombinations and are contemplated within the scope of the claims. Not all steps listed in the various figures need be carried out in the specific order described.

The technology claimed is:

1. A wireless system having bandwidth estimation components at a base station that determine an exponentially averaged communication rate for a wireless device, the wireless system comprises:
   a plurality of wireless devices that communicate at communication rates $R_i(t)$, wherein t identifies a time slot and i identifies the wireless device; and
   the bandwidth estimation component determines that the communication session for each wireless device is elastic or inelastic based on an exponentially averaged rho value ($\bar{\rho}$), determines a number (N) of the plurality of wireless devices actively communicating via the base station, and calculates an exponentially averaged communication rate ($\overline{R_i(t)}$) for each wireless device using communication rates $R_i(t)$ received from the plurality of wireless devices, wherein the bandwidth estimation component evaluates the exponentially averaged rho value ($\rho_i(t)$) for time slot t based on a rho value $\rho_i(t)$ at time slot t and an exponentially averaged rho value $\rho_i(t-$ 1) at time t−1, wherein the bandwidth estimation component evaluates $\overline{R_i(t)} = \beta R_i(t) + (1-\beta)\overline{R_i(t-1)}$ to determine the exponentially averaged communication rate for a wireless device, and wherein the beta value ($\beta$) is a configurable constant value.

2. The wireless system of claim 1, wherein the base station stores an exponentially averaged communication rate reported by each of the plurality of wireless device during each time slot.

3. The wireless system of claim 2, wherein the duration of time slot t is 1.67 milliseconds.

4. The wireless system of claim 2, wherein $R_i(t)$ is the current communication rate of ith wireless device of the plurality of wireless devices during time slot t.

5. The wireless system of claim 4, wherein the bandwidth estimation component evaluates the exponentially averaged communication rate $\overline{R_i(t)}$ for time slot t is based on a communication rate $\overline{R_i(t)}$ at time slot t and an exponentially averaged communication rate $\overline{R_i(t-1)}$ at time t−1.

6. The wireless system of claim 1, wherein the beta value ($\beta$) is 1/10000.

* * * * *